United States Patent
Yigit

(10) Patent No.: US 11,937,732 B2
(45) Date of Patent: Mar. 26, 2024

(54) APPARATUSES AND METHODS FOR FACILITATING BREWING OF BEVERAGES IN A CONTAINER

(71) Applicant: Zihni Enes Yigit, Irvine, CA (US)

(72) Inventor: Zihni Enes Yigit, Irvine, CA (US)

(73) Assignee: MIE Concepts INC, Irvine, CA (US)

( * ) Notice: Subject to any disclaimer, the term of this patent is extended or adjusted under 35 U.S.C. 154(b) by 0 days.

(21) Appl. No.: 18/230,641

(22) Filed: Aug. 6, 2023

(65) Prior Publication Data
US 2023/0371733 A1    Nov. 23, 2023

(51) Int. Cl.
*A47J 31/20*    (2006.01)
(52) U.S. Cl.
CPC ..................... *A47J 31/20* (2013.01)
(58) Field of Classification Search
CPC ............. A47J 31/42; A47J 31/20; A47J 31/00
USPC ......... 99/279, 283, 286, 287, 297, 298, 299, 99/300, 316, 317, 318, 319, 321
See application file for complete search history.

(56) References Cited

U.S. PATENT DOCUMENTS

| | | |
|---|---|---|
| 2004/0134357 A1 | 7/2004 | Cai |
| 2014/0060337 A1 | 3/2014 | Arnum |
| 2015/0322389 A1* | 11/2015 | Anderson ............... A61B 50/15 99/276 |
| 2021/0153686 A1 | 5/2021 | McLean et al. |
| 2022/0053965 A1 | 2/2022 | Caillenton |

FOREIGN PATENT DOCUMENTS

| | | |
|---|---|---|
| EP | 2979592 B1 | 8/2018 |
| WO | 2017205293 A1 | 11/2017 |

* cited by examiner

*Primary Examiner* — Phuong T Nguyen
(74) *Attorney, Agent, or Firm* — Dhiraj Jindal; PATENT YOGI LLC

(57) ABSTRACT

An apparatus for facilitating brewing of beverages in a container includes an apparatus container and a plunger assembly. The apparatus container includes a base and a side wall extending from the base to define an interior space. A bottom end of the side wall is peripherally attached to the base and a top end of the side wall defines an opening. The apparatus container includes openings disposed on the side wall and disposable in the container for brewing a beverage in the container comprising a brewing fluid. The apparatus container receives a beverage ingredient in the interior space through the opening for the brewing. The plunger assembly includes a plunger handle and a plunger head and moves the plunger head into the interior space based on a force applied to the plunger handle. The brewing of the beverage is further based on the moving of the plunger head.

12 Claims, 18 Drawing Sheets

APPARATUSES AND METHODS FOR FACILITATING BREWING OF BEVERAGES IN A CONTAINER

FIELD OF THE INVENTION

Generally, the present disclosure relates to the field of foods and beverages apparatus. More specifically, the present disclosure relates to apparatuses and methods for facilitating brewing of beverages in a container.

BACKGROUND OF THE INVENTION

Traditional coffee and tea brewing methods often lack control over the brewing process, resulting in a limited ability to customize the flavor and strength of the beverage.

Traditional coffee brewers and tea makers are often bulky and not easily portable, restricting their use to specific locations such as homes or offices. Additionally, these conventional brewing methods offer limited control over the density or strength of the beverages being prepared. Many existing coffee brewers also suffer from the issue of excessive messiness, requiring the use of multiple cups, pots, or filters during the brewing process. This not only adds complexity but also increases the effort required for cleaning and maintenance. Furthermore, most coffee brewers are designed to produce multiple cups of coffee or tea at once, which can lead to wastage when a single cup is desired.

Therefore, there is a need for improved apparatuses and methods for facilitating brewing of beverages in a container that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating brewing of beverages in a container, in accordance with some embodiments. Accordingly, the apparatus may include an apparatus container and a plunger assembly. Further, the apparatus container may include a base and a side wall extending from the base. Further, a bottom end of the side wall may be peripherally attached to the base and a top end of the side wall defines an opening of the apparatus container. Further, the base and the side wall define an interior space of the apparatus container. Further, the apparatus container may include a filter portion comprising a plurality of openings comprised in the side wall. Further, the apparatus container may be disposable in the container for brewing at least one beverage in the container. Further, the container may include at least one brewing fluid. Further, the filter portion comprising the plurality of openings allows moving of the at least one brewing fluid between the container and the interior space. Further, the apparatus container may be configured for receiving at least one beverage ingredient in the interior space through the opening for the brewing of the at least one beverage in the container. Further, the plunger assembly may be coupled with the apparatus container. Further, the plunger assembly may include a plunger handle and a plunger head. Further, the plunger assembly may be configured for moving the plunger head into the interior space of the apparatus container based on at least one force applied to the plunger handle. Further, the brewing of the at least one beverage may be further based on the moving of the plunger head into the interior space of the apparatus container.

Further disclosed herein is an apparatus for facilitating brewing of beverages in a container, in accordance with some embodiments. Accordingly, the apparatus may include an apparatus container and a plunger assembly. Further, the apparatus container may include a base and a side wall extending from the base. Further, a bottom end of the side wall may be peripherally attached to the base and a top end of the side wall defines an opening of the apparatus container. Further, the base and the side wall define an interior space of the apparatus container. Further, the apparatus container may include a filter portion comprising a plurality of openings comprised in the side wall. Further, the apparatus container may be disposable in the container for brewing at least one beverage in the container. Further, the container may include at least one brewing fluid. Further, the filter portion comprising the plurality of openings allows moving of the at least one brewing fluid between the container and the interior space. Further, the apparatus container may be configured for receiving at least one beverage ingredient in the interior space through the opening for the brewing of the at least one beverage in the container. Further, the apparatus container may be comprised of a stainless steel material. Further, a size of each of the plurality of openings of the filter portion may be at least 200 microns. Further, the plunger assembly may be coupled with the apparatus container. Further, the plunger assembly may include a plunger handle and a plunger head. Further, the plunger assembly may be configured for moving the plunger head into the interior space of the apparatus container based on at least one force applied to the plunger handle. Further, the brewing of the at least one beverage may be further based on the moving of the plunger head into the interior space of the apparatus container.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
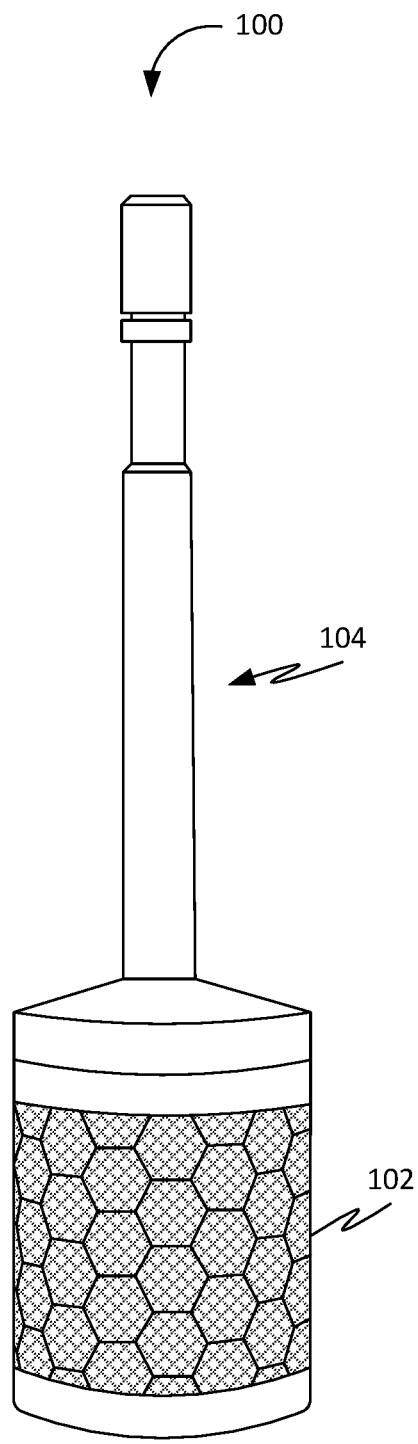
FIG. 1 is a front view of an apparatus 100 for facilitating brewing of beverages in a container, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of apparatuses and methods for facilitating brewing of beverages in a container, embodiments of the present disclosure are not limited to use only in this context.

Overview:

The present disclosure describes apparatuses and methods for facilitating brewing of beverages in a container.

Further, the present disclosure describes a FinalPress Coffee and Tea Brewer. Further, the FinalPress Coffee and Tea Brewer relates to the field of coffee, cold brew, and tea brewing devices, specifically a manual press plunger for extracting flavors from coffee grounds and tea leaves. Further, the FinalPress Coffee and Tea Brewer provides a manual press plunger in a cup that allows users to adjust the pressure and extraction time, thereby enabling a more personalized brewing experience.

Further, the FinalPress Coffee and Tea Brewer comprises several key components that work together to extract flavors from coffee grounds and tea leaves. Further, the components of the FinalPress Coffee and Tea Brewer may include a detachable filter. Further, the filter effectively separates coffee grounds or tea leaves from the brewed beverage, ensuring a clean and flavorful result. Users can place the desired amount of coffee grounds or tea leaves into the filter, allowing for customization of taste preferences. Further, the components of the FinalPress Coffee and Tea Brewer may include a plunger system. Further, the plunger system serves as the core mechanism of the FinalPress Coffee and Tea Brewer and consists of a plunger with a handle and a plunger head, enabling controlled pressure and extraction during the brewing process. Further, the FinalPress Coffee and Tea Brewer brews coffee and tea in the cup for eliminating any mess.

Further, the present disclosure describes a method for brewing beverages using the FinalPress Coffee and Tea Brewer. Further, the method may include the following steps 1—Adding water to a cup or mug.

2—Placing the desired amount of coffee grounds or tea leaves into the filter.

3—Closing the filter onto the brewing plunger system, ensuring a secure fit.

4—Stirring the coffee grounds or tea leaves in the cup or mug by holding them from a top of the plunger pipe to facilitate extraction and enhance flavor.

5—Allowing the mixture to steep for a recommended duration to achieve desired taste preferences.

6—Finally, applying downward pressure on the plunger using the handle to extract flavors from the coffee grounds or tea leaves and produce a well-brewed beverage.

Further, the FinalPress Coffee and Tea Brewer or the FinalPress Portable Coffee and Tea Brewing Tool is an innovative solution for the on-the-go brewing of coffee and tea. Further, the FinalPress Coffee and Tea Brewer offers convenience and customization to coffee, cold brew, and tea enthusiasts based on its compact design, detachable filter, and user-friendly plunger system. Further, the FinalPress Coffee and Tea Brewer addresses the need for a portable and versatile brewing tool. Further, the FinalPress Coffee and Tea Brewer is made up of stainless steel as the primary material to enhance its strength and longevity.

Further, the FinalPress Coffee and Tea Brewer provide a more convenient brewing solution. Further, the FinalPress Coffee and Tea Brewer offers compactness and portability, making it ideal for travel and on-the-go use. Further, the FinalPress Coffee and Tea Brewer is a compact and portable coffee and tea brewing device designed to brew a single cup directly in the cup itself, eliminating the need for additional containers or filters. The spring plunger system of the FinalPress Coffee and Tea Brewer allows users to control the density or strength of their drink by pressing the plunger multiple times, enabling customization of the strength and intensity of tea or coffee to individual preferences. The spring plunger is manually pressed by hand, pushing through the coffee or tea in the stainless steel filter below to extract hidden flavors and oils directly into the cup. To use the FinalPress Coffee and Tea Brewer, the user adds the desired amount of coffee grounds or tea leaves into the stainless steel filter. The plunger system then screws on top of the filter. The device is placed in hot water, stirred, and left to steep for two minutes, and then the plunger is pressed to complete the brewing process. The stainless steel filter with 200-micron holes, efficiently separates the coffee grounds or tea leaves from the brewed beverage, eliminating the need for additional waste-generating materials. The high-quality stainless steel construction ensures durability and resistance to corrosion, making it suitable for long-term use. With the FinalPress Coffee and Tea Brewer, coffee or tea can be brewed directly in the cup, eliminating the need for additional containers and minimizing mess. This streamlined approach of the FinalPress Coffee and Tea Brewer simplifies the brewing process and enhances the overall user experience. Furthermore, the FinalPress Coffee and Tea Brewer eliminates the need for replaceable paper filters, as it is made of stainless steel. This not only reduces waste but also ensures durability and ease of use.

Further, the FinalPress Coffee and Tea Brewer addresses the limitations of traditional brewing methods and provides a unique and improved solution for coffee and tea enthusiasts. Further, the FinalPress Coffee and Tea Brewer's compact design, control over density, mess-free brewing, and use of stainless steel materials make it a versatile and user-friendly option for brewing a cup of coffee or tea.

FIG. 1 is a front view of an apparatus 100 for facilitating brewing of beverages in a container, in accordance with some embodiments. Accordingly, the apparatus 100 may include an apparatus container 102 and a plunger assembly 104. Further, the apparatus 100 may be a FinalPress Coffee and Tea Brewer.

Further, the apparatus container 102 may include a base 202 and a side wall 204 extending from the base 202. Further, the apparatus container 102 may be a filter. Further, a bottom end 206 of the side wall 204 may be peripherally attached to the base 202 and a top end 208 of the side wall 204 defines an opening 210 of the apparatus container 102. Further, the base 202 and the side wall 204 define an interior space 212 of the apparatus container 102. Further, the apparatus container 102 may include a filter portion 214 comprising a plurality of openings comprised in the side wall 204. Further, the apparatus container 102 may be disposable in the container (such as a container 1502) for brewing at least one beverage in the container. Further, the filter portion 214 may be a mesh. Further, the container may include a cup, a mug, a jar, etc. Further, the at least one beverage may include a tea, a coffee, etc. Further, the container may include at least one brewing fluid. Further, the at least one brewing fluid may include water, milk, etc. Further, the filter portion 214 comprising the plurality of openings allows moving of the at least one brewing fluid between the container and the interior space 212. Further, the apparatus container 102 may be configured for receiving at least one beverage ingredient in the interior space 212 through the opening 210 for the brewing of the at least one beverage in the container. Further, the at least one beverage ingredient may include tea leaves, coffee grounds, etc.

Further, the plunger assembly 104 may be coupled with the apparatus container 102. Further, the plunger assembly 104 may be a plunger system. Further, the plunger assembly 104 may include a plunger handle 302 and a plunger head 304. Further, the plunger assembly 104 may be configured for moving the plunger head 304 into the interior space 212 of the apparatus container 102 based on at least one force applied to the plunger handle 302. Further, the at least one force may be a downward force. Further, the downward force may be applied to the plunger handle 302 by a user with a hand. Further, the user may apply a pushing action to the plunger handle 302 to apply the downward force. Further, the moving of the plunger head 304 extracts flavors and/or oils from the at least one beverage ingredient and mixes the flavors and/or oils with the at least one brewing fluid. Further, the at least one brewing fluid moves into the interior space 212 through the plurality of openings in the filter portion 214 to mix with the at least one beverage ingredient and gain the flavors and/or oils for increasing density and/or intensity of the at least one brewing fluid and moves out of the interior space 212 to the container after gaining the flavors and/or oils through the plurality of openings of the filter portion 214 without the at least one beverage ingredient based on the moving of the plunger head 304 for the brewing of the at least one beverage. Further, the filter portion 214 restricts a movement of the at least one beverage ingredient along the at least one brewing fluid from the interior space 212 during the moving of the plunger head 304. Further, the brewing of the at least one beverage may be further based on the moving of the plunger head 304 into the interior space 212 of the apparatus container 102. Further, the moving of the plunger head 304 may be repeated a number of times to subsequently increase the density and/or intensity of the at least one brewing fluid until the at least one beverage may be prepared in the container of a preferred density and/or intensity.

Further, in some embodiments, the plunger assembly 104 further may include an end cap 306 configured to be coupled with the opening 210 for closing the opening 210 based on the coupling of the plunger assembly 104 with the apparatus container 102. Further, the end cap 306 may prevent a movement of the at least one brewing fluid between the interior space 212 and the container through the opening 210 during the moving of the plunger head 304 while the brewing of the at least one beverage.

Further, in an embodiment, the end cap 306 may include a cap base 308 and a cap side wall 310 extending from the cap base 308. Further, the end cap 306 may be an attaching cap. Further, a first end 312 of the cap side wall 310 may be peripherally attached to the cap base 308 and a second end 314 of the cap side wall 310 defines a cap aperture 316. Further, the end cap 306 may include a first threaded portion 318 disposed proximal to the second end 314 of the cap side wall 310. Further, the apparatus container 102 may include a second threaded portion 220 disposed proximal to the top end 208 of the side wall 310. Further, the first threaded portion 318 may be configured to be threadedly engaged with the second threaded portion 220 for coupling the end cap 306 to the opening 210 for the coupling of the plunger assembly 104 to the apparatus container 102.

Further, in an embodiment, the cap base 308 and the cap side wall 310 define a cap interior space 402 for the end cap 306. Further, the plunger head 304 may be movably disposed in the cap interior space 402. Further, the moving of the plunger head 304 may include moving the plunger head 304 between the cap interior space 402 and the interior space 212. Further, the at least one brewing fluid moves into the interior space 212 from the container through the filter portion 214 when the plunger head 304 is disposed in the cap interior space 402. Further, the at least one brewing fluid moves out from the interior space 212 when the plunger head 304 moves from the cap interior space 402 to the interior space 212.

Further, in an embodiment, the plunger assembly 104 may include a plunger sleeve 320 and a plunger rod 322. Further, the plunger sleeve 320 may be an outer pipe. Further, the plunger sleeve 320 may include an internal chamber 324 extending between a first open end 326 of the plunger sleeve 320 and a second open end 328 of the plunger sleeve 320. Further, the second open end 328 may be attached to an outer surface 330 of the cap base 308 around a cap opening 332 disposed on the cap base 308 of the end cap 306. Further, the plunger rod 322 may be movably disposed in the internal chamber 324 of the plunger sleeve 320. Further, the plunger rod 322 extends between a first rod end 334 and a second rod end 336. Further, the second rod end 336 may be attached to the plunger head 304 on a top side of the plunger head 304 by extending through the cap opening 332 and the first rod end 334 may be attached to the plunger handle 302 on a bottom side of the plunger handle 302. Further, the plunger rod 332 moves from a first position to at least one second position in the internal chamber 324 based on the at least one force for the moving of the plunger head 304

Further, in an embodiment, the plunger assembly 104 may include a spring 338 coupled with the plunger rod 322. Further, the spring 338 may be disposed in the internal chamber 324 of the plunger sleeve 320. Further, the spring 338 may include a first spring end 340 and a second spring end 342. Further, the first spring end 340 may be attached to the plunger handle 302 on the bottom side of the plunger handle 302 and the second spring end 342 may be attached to the second open end 328 of the plunger sleeve 320. Further, the spring 338 may be configured for transitioning from an extended state to a compressed state based on the at least one force for facilitating the moving of the plunger head 304 from the cap interior space 402 to the interior space 212. Further, the spring 338 may be configured for transitioning from the compressed state to the extended state based on a removal of the at least one force for moving the plunger head 304 from the interior space 212 to the cap interior space 402 by moving the plunger rod 322 from the at least one second position to the first position.

Further, in an embodiment, the plunger handle 302 may include a handle top 344 and a handle rod 346 coupled with the handle top 344. Further, the handle rod 346 extends between a first handle end 348 and a second handle end 350. Further, the spring 338 and the plunger rod 322 may be attached to the second handle end 350 of the handle rod 346. Further, the handle rod 346 moves in the internal chamber 324 based on the at least one force. Further, the moving of the handle rod 346 moves the plunger head 304.

Further, in an embodiment, the handle rod 346 may include a first stopping element 352 disposed on the handle rod 346 proximal to the first handle end 348. Further, the plunger sleeve 320 may include a second stopping element 354 disposed on the plunger sleeve 320 proximal to the first open end 326. Further, the first stopping element 352 interfaces with the second stopping element 354 for limiting the moving of the handle rod 346 into the internal chamber 324 to a moving limit. Further, the limiting of the moving of the handle rod 346 limits a distance of the moving of the plunger head 304 from the cap interior space 402 to the interior space 212 by the moving limit. Further, the first stopping element 352 and the second stopping element 354 form a collision mechanism of the apparatus 100. Further, the first stopping element 352 may be one or more protrusions extending laterally from the handle rod 346. Further, the second stopping element 354 may be one or more protrusions extending laterally from the plunger sleeve 320.

Further, in an embodiment, the first stopping element 352 may include at least one male screw thread 356 disposed on an exterior of the first stopping element 352. Further, the second stopping element 354 may include at least one female screw thread 358 disposed on an interior of the second stopping element 354. Further, the at least one male screw thread 356 may be configured to be disengagably engaged with the at least one female screw thread 358 for transitioning the plunger rod 322 between a locked state and an unlocked state after the moving of the handle rod 346 into the internal chamber 324 to the moving limit. Further, the moving of the handle rod 346 moves the plunger rod 322 from the first position to a second position of the at least one second position. Further, the plunger rod 322 may be allowed to transition from the second position to the first position in the unlocked state. Further, the plunger rod 322 may not be allowed to transition from the second position to the first position in the locked state. Further, the disengagably engaging of the at least one male screw thread 356 with the at least one female screw thread 358 allows the user to keep the plunger rod 322 in the second position by transitioning the plunger rod 322 to the locked state after the moving of the handle rod 346 into the internal chamber 324 to the moving limit.

Further, in some embodiments, the plunger assembly 104 may be detachably coupled with the apparatus container 102.

Further, in some embodiments, the apparatus container 102 may be comprised of a stainless steel material.

Further, in some embodiments, a size of each of the plurality of openings of the filter portion 214 may be at least 200 microns.

Figure 2:
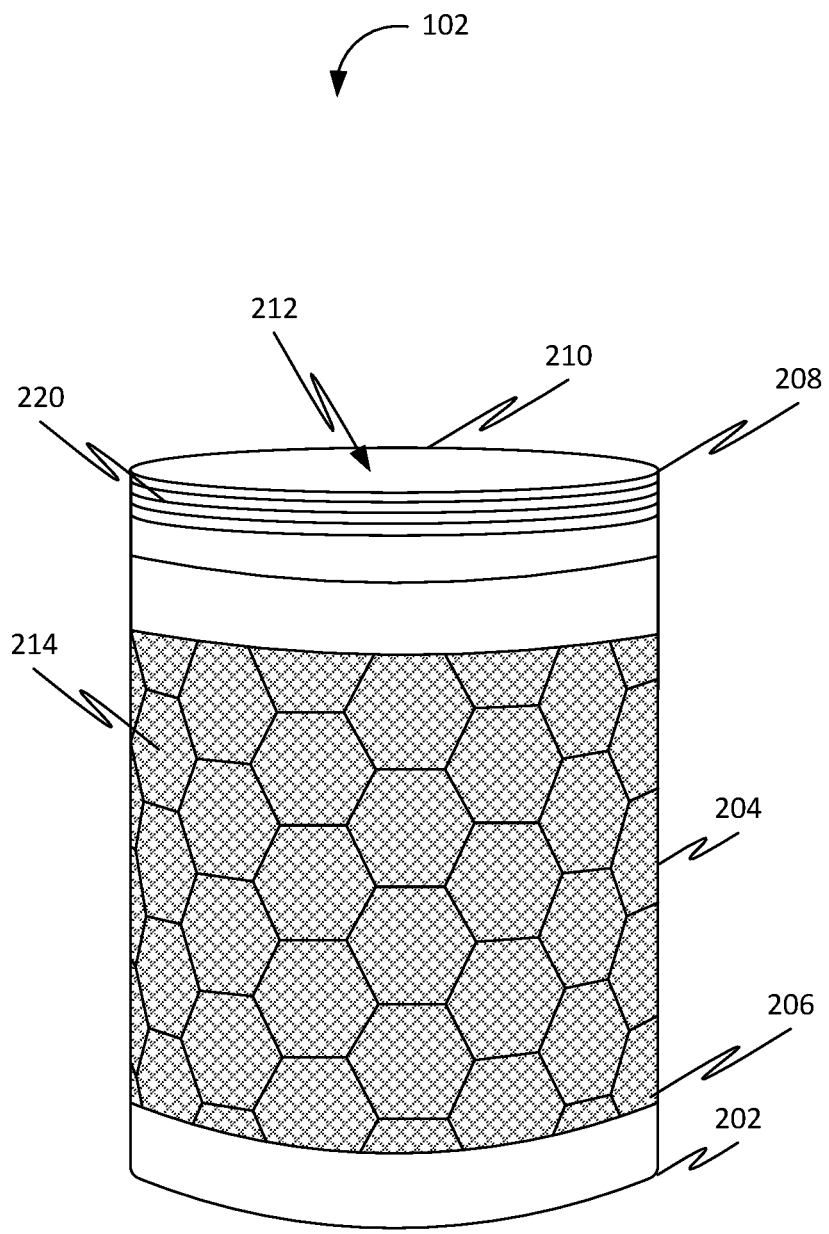
FIG. 2 is a front view of the apparatus container 102 of the apparatus 100, in accordance with some embodiments.

FIG. 2 is a front view of the apparatus container 102 of the apparatus 100, in accordance with some embodiments.

Figure 3:
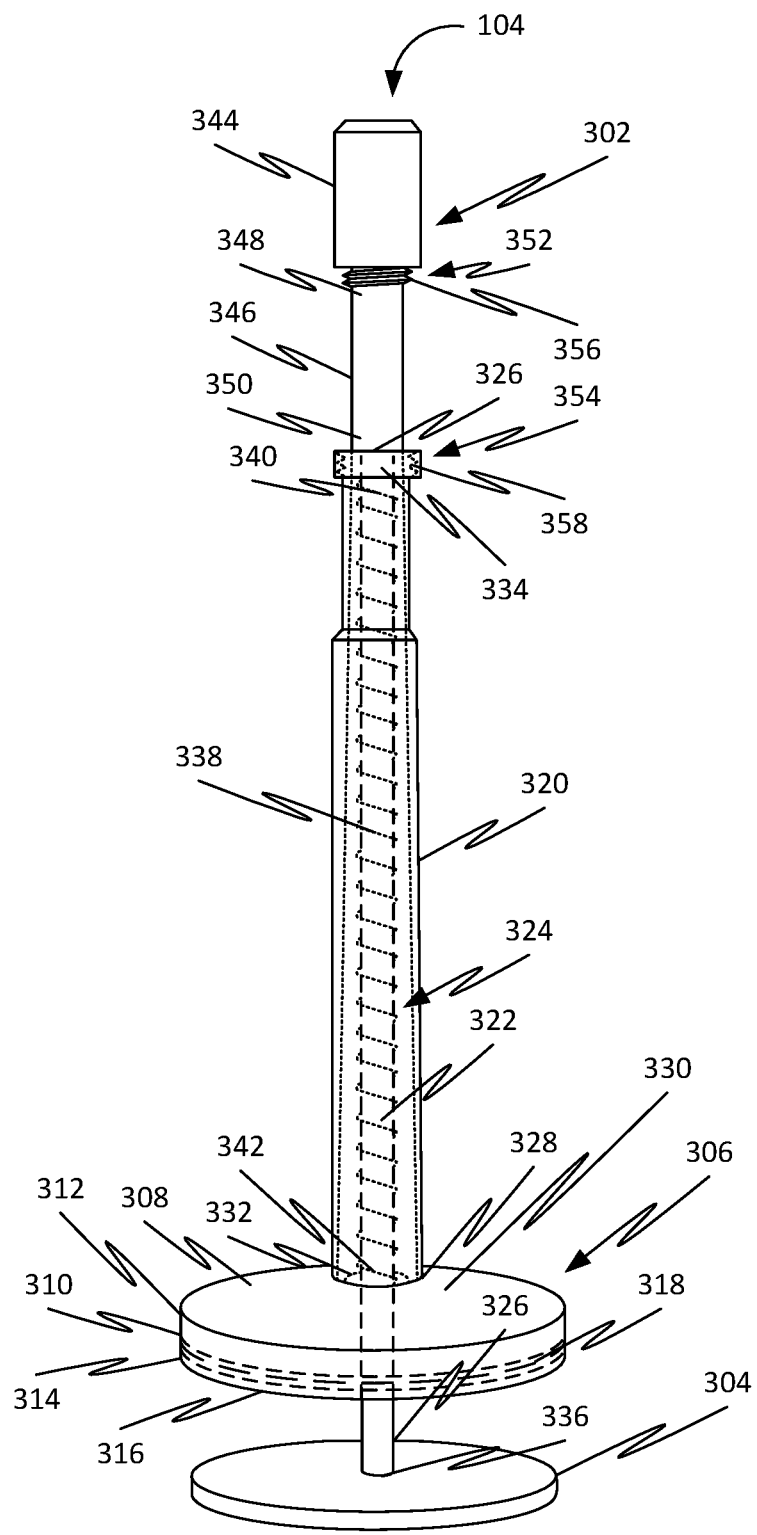
FIG. 3 is a front view of the plunger assembly 104 of the apparatus 100, in accordance with some embodiments.

FIG. 3 is a front view of the plunger assembly 104 of the apparatus 100, in accordance with some embodiments.

Figure 4:
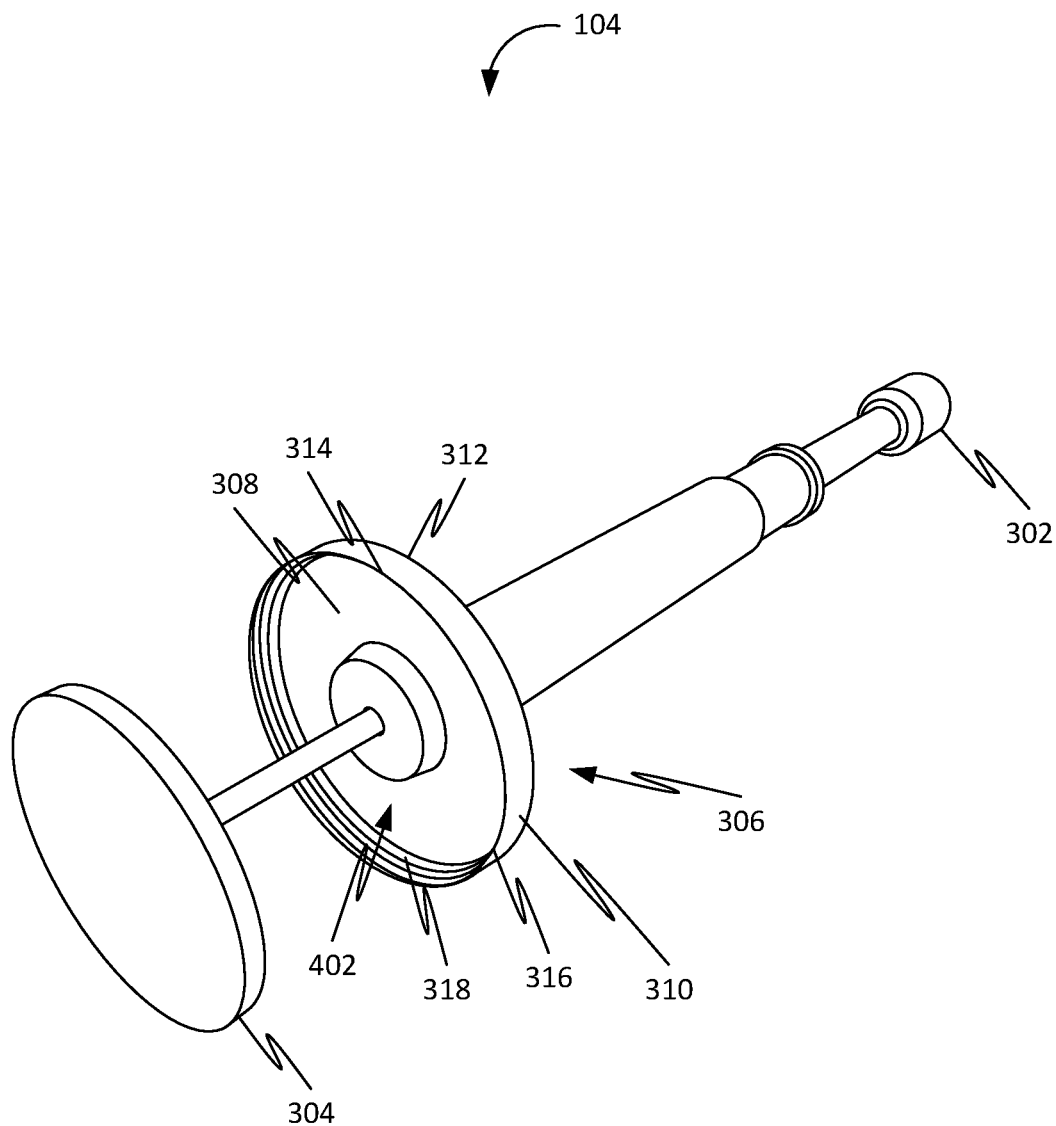
FIG. 4 is a bottom perspective view of the plunger assembly 104 of the apparatus 100 with the plunger head 304 moved from the cap interior space 402, in accordance with some embodiments.

FIG. 4 is a bottom perspective view of the plunger assembly 104 of the apparatus 100 with the plunger head 304 moved from the cap interior space 402, in accordance with some embodiments.

Figure 5:
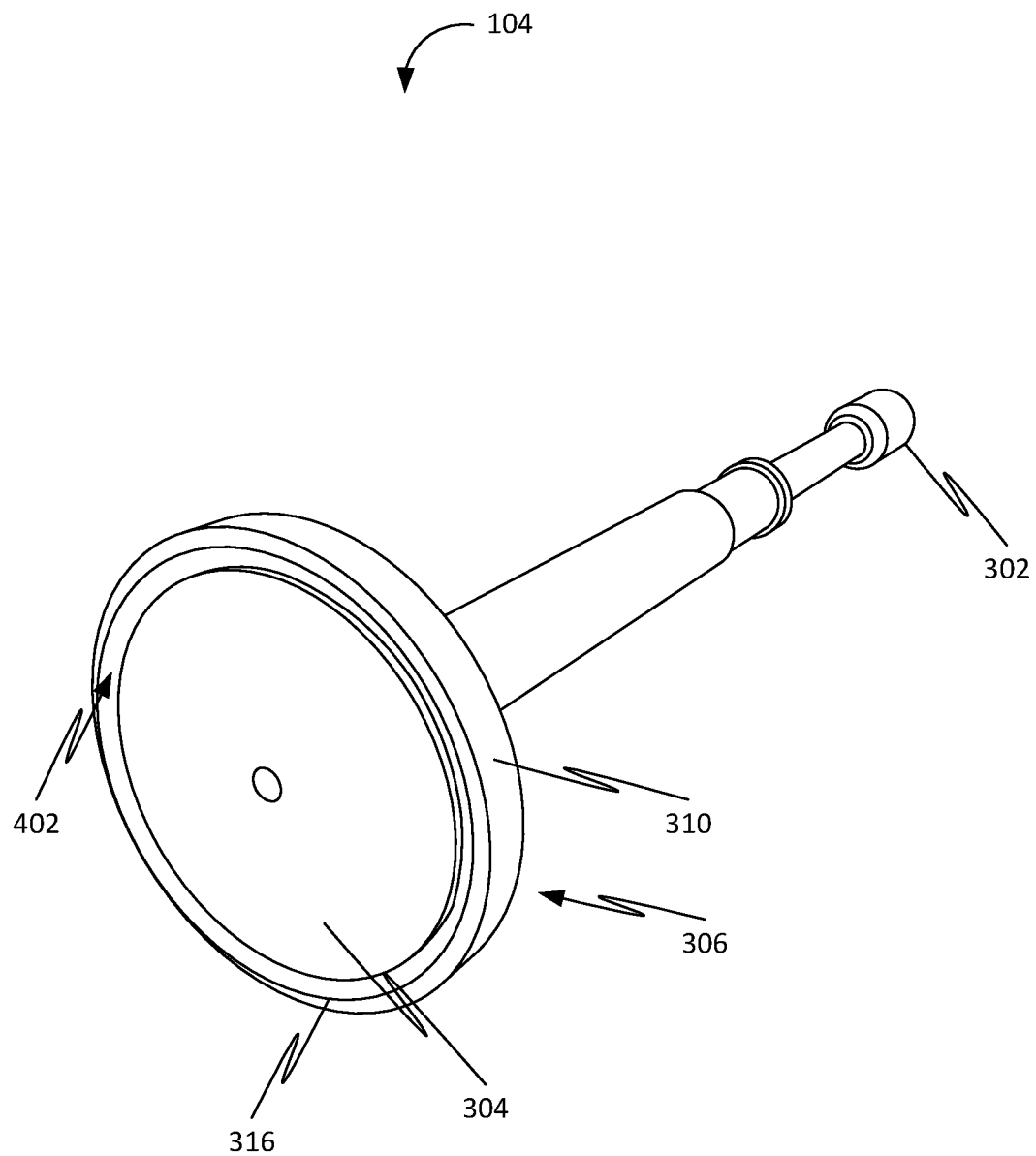
FIG. 5 is a bottom perspective view of the plunger assembly 104 of the apparatus 100 with the plunger head 304 disposed in the cap interior space 402, in accordance with some embodiments.

FIG. 5 is a bottom perspective view of the plunger assembly 104 of the apparatus 100 with the plunger head 304 disposed in the cap interior space 402, in accordance with some embodiments.

Figure 6:
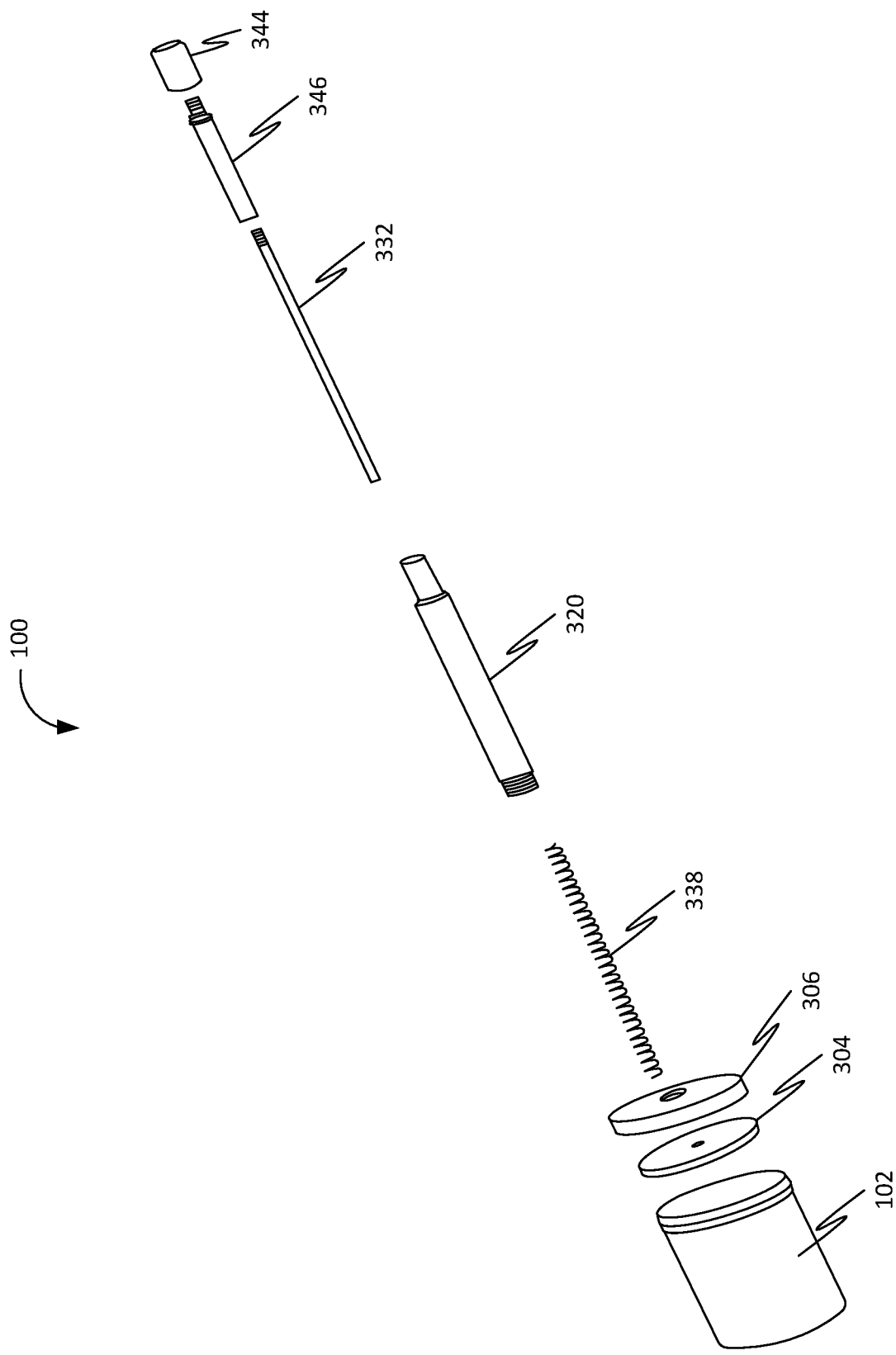
FIG. 6 is an exploded view of the apparatus 100, in accordance with some embodiments.

FIG. 6 is an exploded view of the apparatus 100, in accordance with some embodiments.

Figure 7:
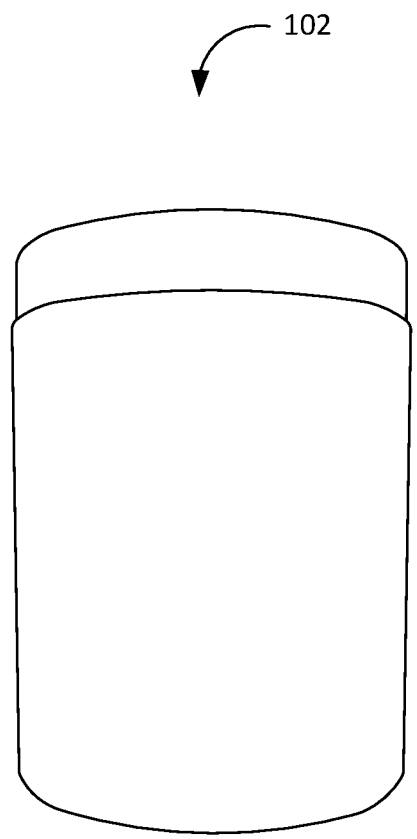
FIG. 7 is a front view of the apparatus container 102 of the apparatus 100, in accordance with some embodiments.

FIG. 7 is a front view of the apparatus container 102 of the apparatus 100, in accordance with some embodiments.

Figure 8:
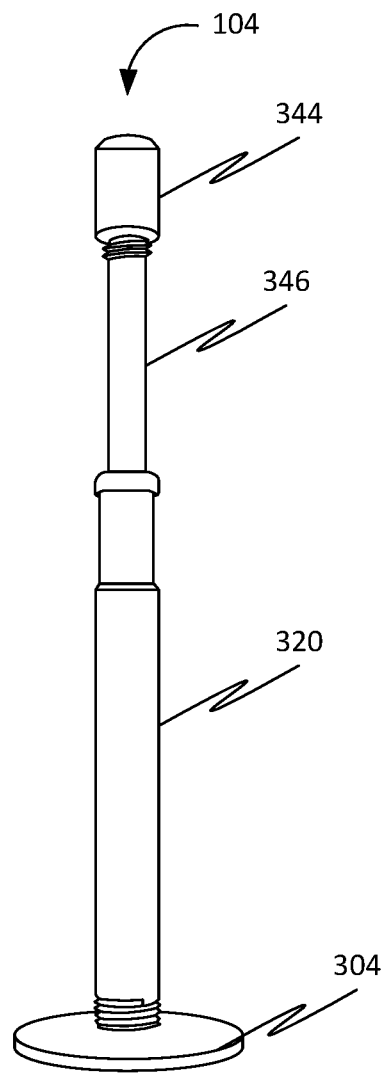
FIG. 8 is a front view of the plunger assembly 104 of the apparatus 100 without the end cap 306, in accordance with some embodiments.

FIG. 8 is a front view of the plunger assembly 104 of the apparatus 100 without the end cap 306, in accordance with some embodiments.

Figure 9:
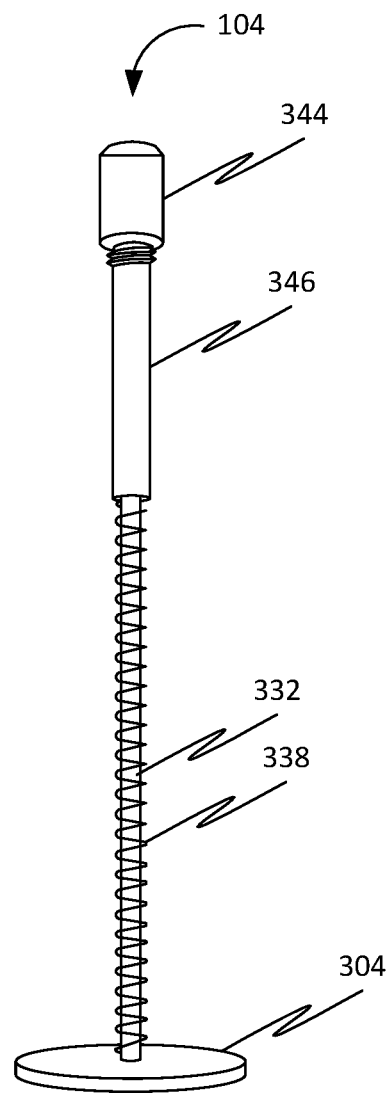
FIG. 9 is a front view of the plunger assembly 104 of the apparatus 100 without the end cap 306 and the plunger sleeve 320, in accordance with some embodiments.

FIG. 9 is a front view of the plunger assembly 104 of the apparatus 100 without the end cap 306 and the plunger sleeve 320, in accordance with some embodiments.

Figure 10:
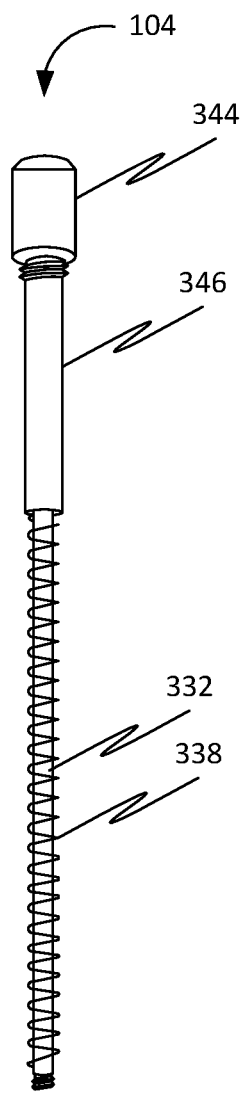
FIG. 10 is a front view of the plunger assembly 104 of the apparatus 100 without the end cap 306, the plunger sleeve 320, and the plunger head 304, in accordance with some embodiments.

FIG. 10 is a front view of the plunger assembly 104 of the apparatus 100 without the end cap 306, the plunger sleeve 320, and the plunger head 304, in accordance with some embodiments.

Figure 11:
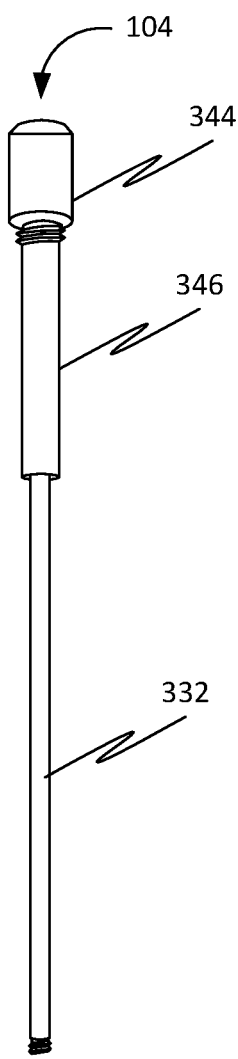
FIG. 11 is a front view of the plunger assembly 104 of the apparatus 100 without the end cap 306, the plunger sleeve 320, the plunger head 304, and the spring 338, in accordance with some embodiments.

FIG. 11 is a front view of the plunger assembly 104 of the apparatus 100 without the end cap 306, the plunger sleeve 320, the plunger head 304, and the spring 338, in accordance with some embodiments.

Figure 12:
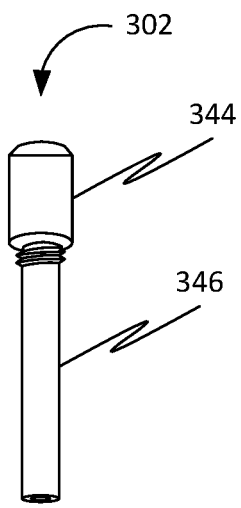
FIG. 12 is a front view of the plunger handle 302 of the plunger assembly 104, in accordance with some embodiments.

FIG. 12 is a front view of the plunger handle 302 of the plunger assembly 104, in accordance with some embodiments.

Figure 13:
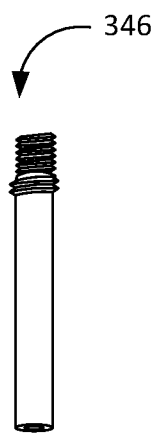
FIG. 13 is a front view of the handle rod 346 of the plunger handle 302, in accordance with some embodiments.

FIG. 13 is a front view of the handle rod 346 of the plunger handle 302, in accordance with some embodiments.

Figure 14:
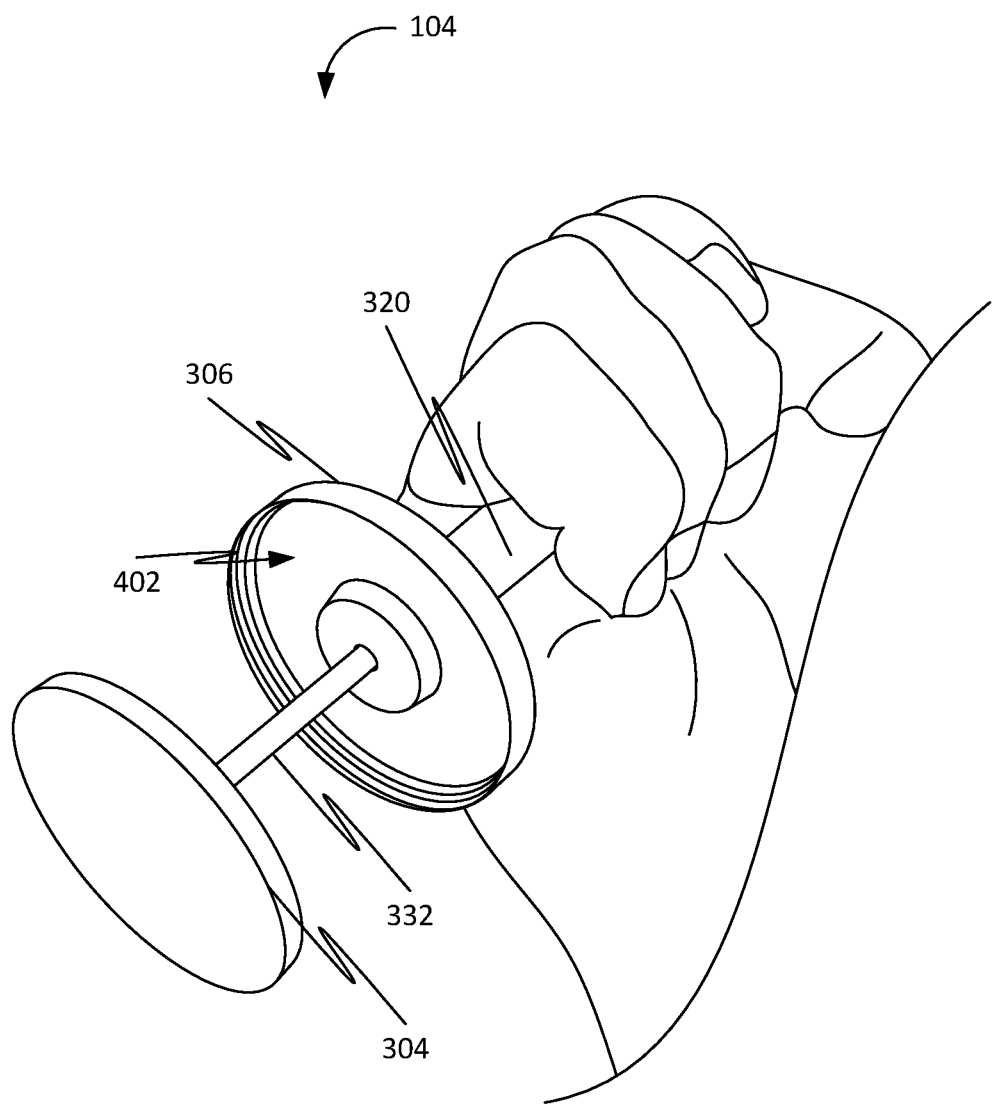
FIG. 14 is a bottom perspective view of the plunger assembly 104 of the apparatus 100 with the plunger head 304 moved from the cap interior space 402 based on the at least one force applied to the plunger head 304 by a hand of a user, in accordance with some embodiments.

FIG. 14 is a bottom perspective view of the plunger assembly 104 of the apparatus 100 with the plunger head 304 moved from the cap interior space 402 based on the at least one force applied to the plunger head 304 by a hand of a user, in accordance with some embodiments.

Figure 15:
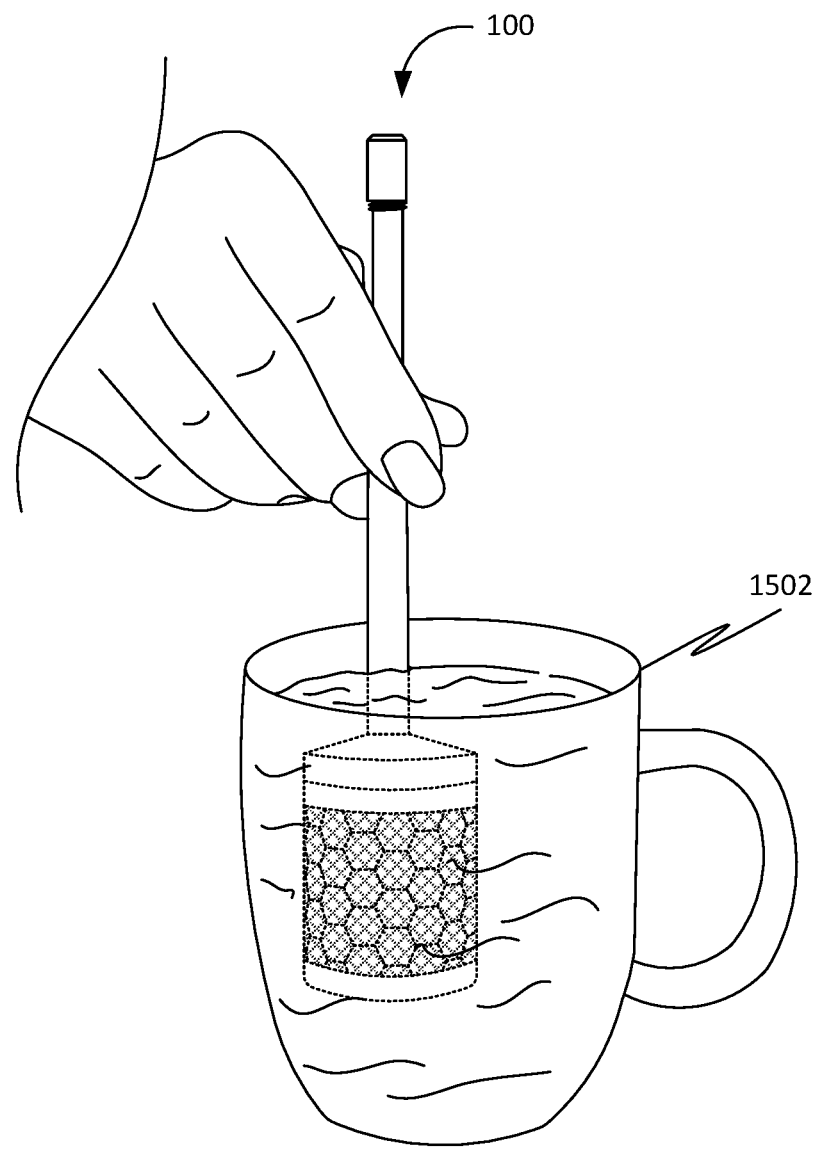
FIG. 15 is a front view of the apparatus 100 disposed in a container 1502 for the brewing of the at least one beverage in the container 1502, in accordance with some embodiments.

FIG. 15 is a front view of the apparatus 100 disposed in a container 1502 for the brewing of the at least one beverage in the container 1502, in accordance with some embodiments. Further, the container 1502 may include a cup, a mug, a jar, etc.

Figure 16:
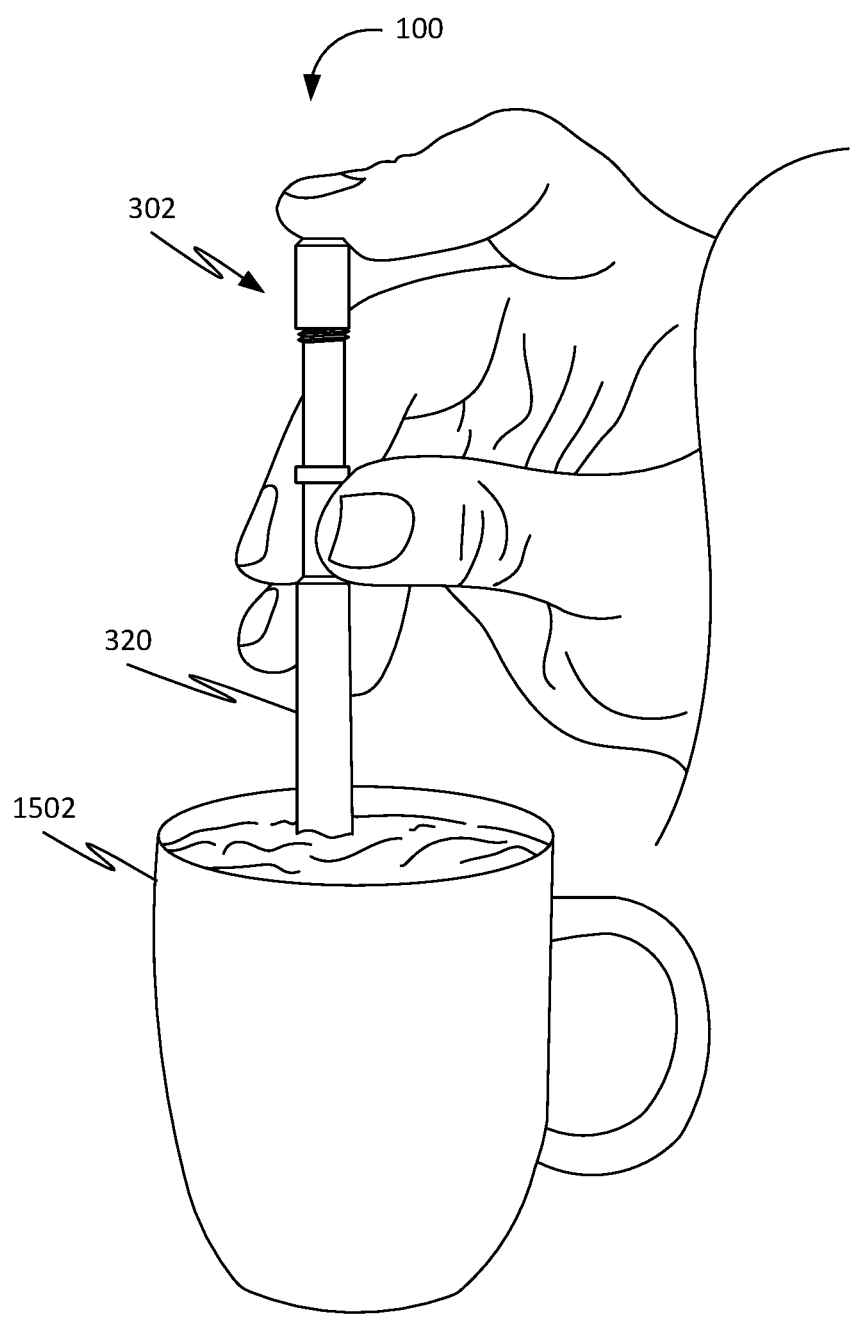
FIG. 16 is a front view of the apparatus 100 disposed in the container for the brewing of the at least one beverage in the container based on the at least one force applied to the plunger head 304 by the hand of the user, in accordance with some embodiments.

FIG. 16 is a front view of the apparatus 100 disposed in the container for the brewing of the at least one beverage in the container based on the at least one force applied to the plunger head 304 by the hand of the user, in accordance with some embodiments.

Figure 17:
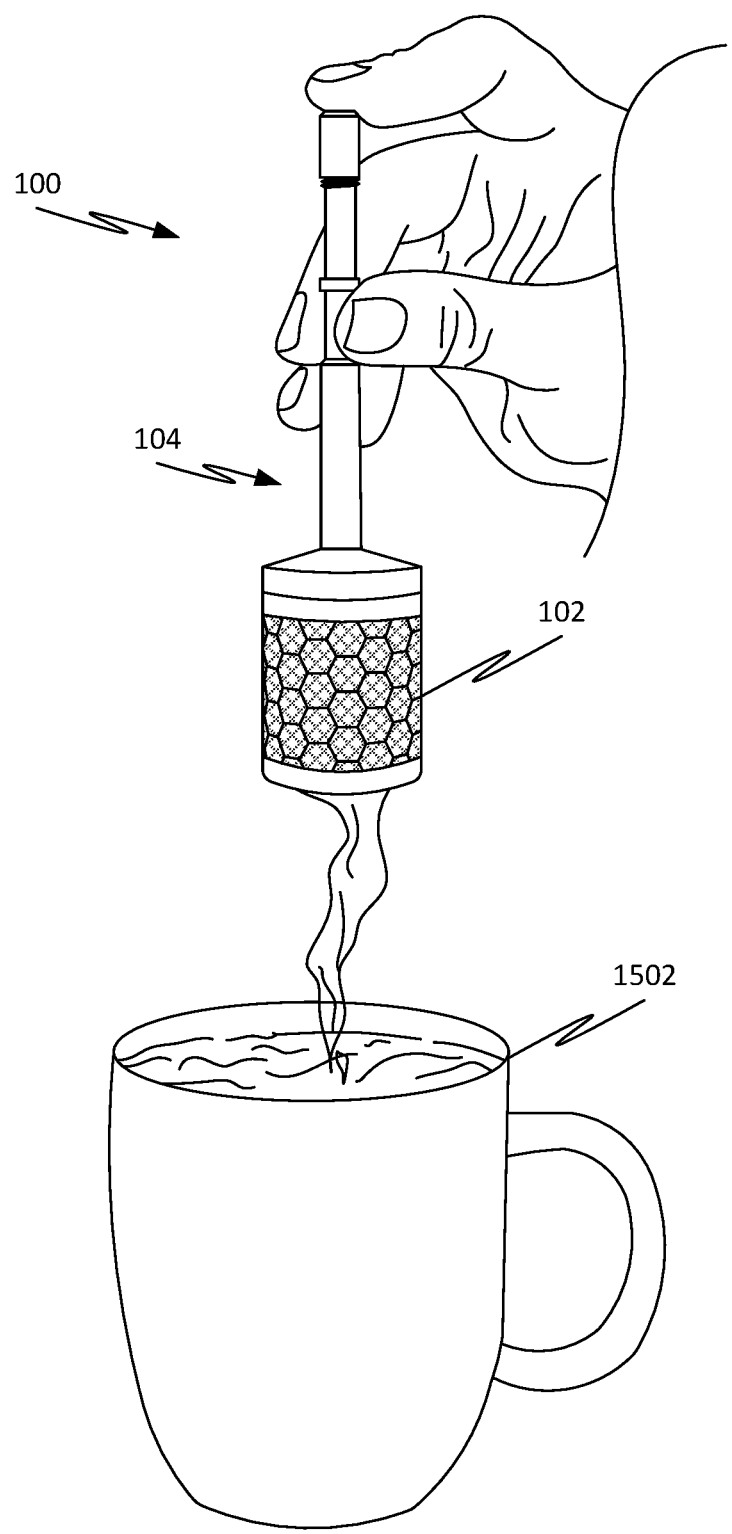
FIG. 17 is a front view of the apparatus 100 removed from the container after the brewing of the at least one beverage in the container, in accordance with some embodiments.

FIG. 17 is a front view of the apparatus 100 removed from the container after the brewing of the at least one beverage in the container, in accordance with some embodiments.

Figure 18:
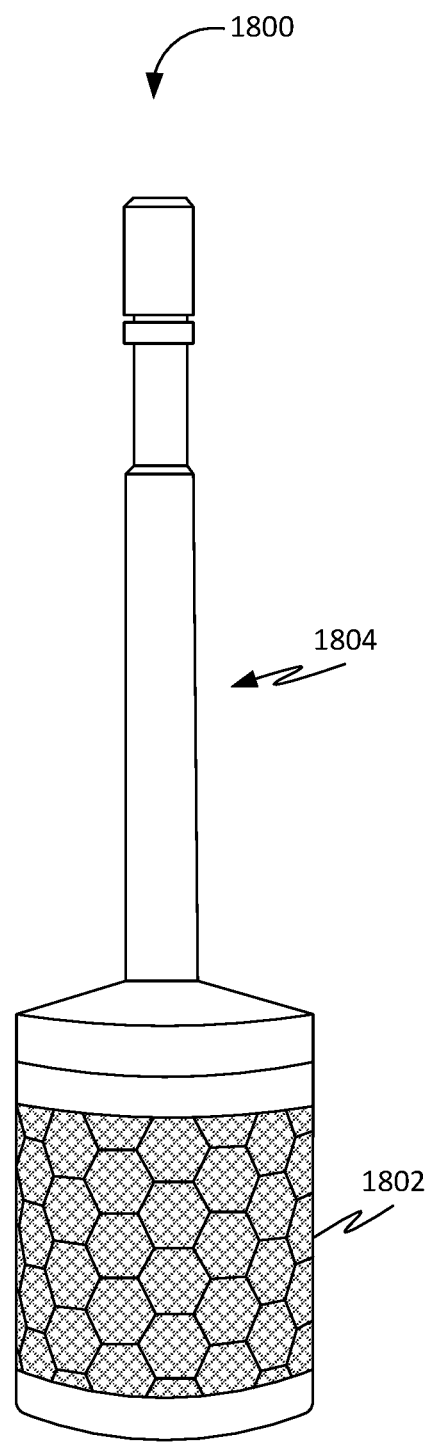
FIG. 18 is a front view of an apparatus 1800 for facilitating brewing of beverages in a container, in accordance with some embodiments.

FIG. 18 is a front view of an apparatus 1800 for facilitating brewing of beverages in a container, in accordance with some embodiments. Accordingly, the apparatus 1800 may include an apparatus container 1802 and a plunger assembly 1804.

Further, the apparatus container 1802 may include a base and a side wall extending from the base. Further, a bottom end of the side wall may be peripherally attached to the base and a top end of the side wall defines an opening of the apparatus container 1802. Further, the base and the side wall define an interior space of the apparatus container 1802. Further, the apparatus container 1802 may include a filter portion comprising a plurality of openings comprised in the side wall. Further, the apparatus container 1802 may be disposable in the container for brewing at least one beverage in the container. Further, the container may include at least one brewing fluid. Further, the filter portion comprising the plurality of openings allows moving of the at least one brewing fluid between the container and the interior space. Further, the apparatus container 1802 may be configured for receiving at least one beverage ingredient in the interior space through the opening for the brewing of the at least one beverage in the container. Further, the apparatus container 1802 may be comprised of a stainless steel material. Further, a size of each of the plurality of openings of the filter portion may be at least 200 microns.

Further, the plunger assembly 1804 may be coupled with the apparatus container 1802. Further, the plunger assembly 1804 may include a plunger handle and a plunger head. Further, the plunger assembly 1804 may be configured for moving the plunger head into the interior space of the apparatus container 1802 based on at least one force applied to the plunger handle. Further, the brewing of the at least one beverage may be based on the moving of the plunger head into the interior space of the apparatus container 1802.

Further, in some embodiments, the plunger assembly 1804 may include an end cap configured to be coupled with the opening for closing the opening based on the coupling of the plunger assembly 1804 with the apparatus container 1802.

Further, in an embodiment, the end cap may include a cap base and a cap side wall extending from the cap base. Further, a first end of the cap side wall may be peripherally attached to the cap base and a second end of the cap side wall defines a cap aperture. Further, the end cap may include a first threaded portion disposed proximal to the second end of the cap side wall. Further, the apparatus container 1802 may include a second threaded portion disposed proximal to the top end of the side wall. Further, the first threaded portion may be configured to be threadedly engaged with the second threaded portion for coupling the end cap to the opening for the coupling of the plunger assembly 1804 to the apparatus container 1802.

Further, in an embodiment, the cap base and the cap side wall define a cap interior space for the end cap. Further, the plunger head may be movably disposed in the cap interior space. Further, the moving of the plunger head may include moving the plunger head between the cap interior space and the interior space.

Further, in an embodiment, the plunger assembly 1804 may include a plunger sleeve and a plunger rod. Further, the plunger sleeve may include an internal chamber extending between a first open end of the plunger sleeve and a second open end of the plunger sleeve. Further, the second open end may be attached to an outer surface of the cap base around a cap opening disposed on the cap base of the end cap. Further, the plunger rod may be movably disposed in the internal chamber of the plunger sleeve. Further, the plunger rod extends between a first rod end and a second rod end. Further, the second rod end may be attached to the plunger head on a top side of the plunger head by extending through the cap opening and the first rod end may be attached to the plunger handle on a bottom side of the plunger handle. Further, the plunger rod moves from a first position to at least one second position in the internal chamber based on the at least one force for the moving of the plunger head.

Further, in an embodiment, the plunger assembly 1804 further may include a spring coupled with the plunger rod. Further, the spring may be disposed in the internal chamber of the plunger sleeve. Further, the spring may include a first spring end and a second spring end. Further, the first spring end may be attached to the plunger handle on the bottom side of the plunger handle and the second spring end may be attached to the second open end of the plunger sleeve. Further, the spring may be configured for transitioning from an extended state to a compressed state based on the at least one force for facilitating the moving of the plunger head from the cap interior space to the interior space. Further, the spring may be configured for transitioning from the compressed state to the extended state based on a removal of the at least one force for moving the plunger head from the interior space to the cap interior space by moving the plunger rod from the at least one second position to the first position.

Further, in an embodiment, the plunger handle may include a handle top and a handle rod coupled with the handle top. Further, the handle rod extends between a first handle end and a second handle end. Further, the spring and the plunger rod may be attached to the second handle end of the handle rod. Further, the handle rod moves in the internal chamber based on the at least one force. Further, the moving of the handle rod moves the plunger head.

Further, in an embodiment, the handle rod may include a first stopping element disposed on the handle rod proximal to the first handle end. Further, the plunger sleeve may include a second stopping element disposed on the plunger sleeve proximal to the first open end. Further, the first stopping element interfaces with the second stopping element for limiting the moving of the handle rod into the internal chamber to a moving limit. Further, the limiting of the moving of the handle rod limits a distance of the moving of the plunger head from the cap interior space to the interior space by the moving limit.

Further, in some embodiments, the plunger assembly 1804 may be detachably coupled with the apparatus container 1802.

Although the present disclosure has been explained in relation to its preferred embodiment, it is to be understood that many other possible modifications and variations can be made without departing from the spirit and scope of the disclosure.

What is claimed is:

1. An apparatus for facilitating brewing of beverages in a container, the apparatus comprising:

an apparatus container comprising a base and a side wall extending from the base, wherein a bottom end of the side wall is peripherally attached to the base and a top end of the side wall defines an opening of the apparatus container, wherein the base and the side wall define an interior space of the apparatus container, wherein the apparatus container comprises a filter portion comprising a plurality of openings comprised in the side wall, wherein the apparatus container is disposable in the container for brewing at least one beverage in the container, wherein the container comprises at least one brewing fluid, wherein the filter portion comprising the plurality of openings allows moving of the at least one brewing fluid between the container and the interior space, wherein the apparatus container is configured for receiving at least one beverage ingredient in the interior space through the opening for the brewing of the at least one beverage in the container; and a plunger assembly coupled with the apparatus container, wherein the plunger assembly comprises a plunger handle and a plunger head, wherein the plunger assembly is configured for moving the plunger head into the interior space of the apparatus container based on at least one force applied to the plunger handle, wherein the brewing of the at least one beverage is further based on the moving of the plunger head into the interior space of the apparatus container, wherein the plunger assembly further comprises an end cap configured to be coupled with the opening for closing the opening based on the coupling of the plunger assembly with the apparatus container, wherein the end cap comprises a cap base and a cap side wall extending from the cap base, wherein a first end of the cap side wall is peripherally attached to the cap base and a second end of the cap side wall defines a cap aperture, wherein the end cap comprises a first threaded portion disposed proximal to the second end of the cap side wall, wherein the apparatus container comprises a second threaded portion disposed proximal to the top end of the side wall, wherein the first threaded portion is configured to be threadedly engaged with the second threaded portion for coupling the end cap to the opening for the coupling of the plunger assembly to the apparatus container, wherein the cap base and the cap side wall define a cap interior space for the end cap, wherein the plunger head is movably disposed in the cap interior space, wherein the moving of the plunger head comprises moving the plunger head between the cap interior space and the interior space, wherein the plunger assembly further comprises a plunger sleeve and a plunger rod, wherein the plunger sleeve comprises an internal chamber extending between a first open end of the plunger sleeve and a second open end of the plunger sleeve, wherein the second open end is attached to an outer surface of the cap base around a cap opening disposed on the cap base of the end cap, wherein the plunger rod is movably disposed in the internal chamber of the plunger sleeve, wherein the plunger rod extends between a first rod end and a second rod end, wherein the second rod end is attached to the plunger head on a top side of the plunger head by extending through the cap opening and the first rod end is attached to the plunger handle on a bottom side of the plunger handle, wherein the plunger rod moves in the internal chamber from a first position to at least one second position in the internal chamber based on the at least one force for the moving of the plunger head.

2. The apparatus of claim 1, wherein the plunger assembly further comprises a spring coupled with the plunger rod, wherein the spring is disposed in the internal chamber of the plunger sleeve, wherein the spring comprises a first spring end and a second spring end, wherein the first spring end is attached to the plunger handle on the bottom side of the plunger handle and the second spring end is attached to the second open end of the plunger sleeve, wherein the spring is configured for transitioning from an extended state to a compressed state based on the at least one force for facilitating the moving of the plunger head from the cap interior space to the interior space, wherein the spring is further configured for transitioning from the compressed state to the extended state based on a removal of the at least one force for moving the plunger head from the interior space to the cap interior space by moving the plunger rod from the at least one second position to the first position.

3. The apparatus of claim 2, wherein the plunger handle comprises a handle top and a handle rod coupled with the handle top, wherein the handle rod extends between a first handle end and a second handle end, wherein the spring and the plunger rod are attached to the second handle end of the handle rod, wherein the handle rod moves in the internal chamber based on the at least one force, wherein the moving of the handle rod moves the plunger head.

4. The apparatus of claim 3, wherein the handle rod comprises a first stopping element disposed on the handle rod proximal to the first handle end, wherein the plunger sleeve comprises a second stopping element disposed on the plunger sleeve proximal to the first open end, wherein the first stopping element interfaces with the second stopping element for limiting the moving of the handle rod into the internal chamber to a moving limit, wherein the limiting of the moving of the handle rod limits a distance of the moving of the plunger head from the cap interior space to the interior space by the moving limit.

5. The apparatus of claim 1, wherein the plunger assembly is detachably coupled with the apparatus container.

6. The apparatus of claim 1, wherein the apparatus container is comprised of a stainless steel material.

7. The apparatus of claim 1, wherein a size of each of the plurality of openings of the filter portion is at least 200 microns.

8. An apparatus for facilitating brewing of beverages in a container, the apparatus comprising:

an apparatus container comprising a base and a side wall extending from the base, wherein a bottom end of the side wall is peripherally attached to the base and a top end of the side wall defines an opening of the apparatus container, wherein the base and the side wall define an interior space of the apparatus container, wherein the apparatus container comprises a filter portion comprising a plurality of openings comprised in the side wall, wherein the apparatus container is disposable in the container for brewing at least one beverage in the container, wherein the container comprises at least one brewing fluid, wherein the filter portion comprising the plurality of openings allows moving of the at least one brewing fluid between the container and the interior space, wherein the apparatus container is configured for receiving at least one beverage ingredient in the interior space through the opening for the brewing of the at least one beverage in the container, wherein the apparatus container is comprised of a stainless steel material, wherein a size of each of the plurality of openings of the filter portion is at least 200 microns; and a plunger assembly coupled with the apparatus container, wherein the plunger assembly comprises a plunger handle and a plunger head, wherein the plunger assembly is configured for moving the plunger head into the interior space of the apparatus container based on at least one force applied to the plunger handle, wherein the brewing of the at least one beverage is further based on the moving of the plunger head into the interior space of the apparatus container, wherein the plunger assembly further comprises an end cap configured to be coupled with the opening for closing the opening based on the coupling of the plunger assembly with the apparatus container, wherein the end cap comprises a cap base and a cap side wall extending from the cap base, wherein a first end of the cap side wall is peripherally attached to the cap base and a second end of the cap side wall defines a cap aperture, wherein the end cap comprises a first threaded portion disposed proximal to the second end of the cap side wall, wherein the apparatus container comprises a second threaded portion disposed proximal to the top end of the side wall, wherein the first threaded portion is configured to be threadedly engaged with the second threaded portion for coupling the end cap to the opening for the coupling of the plunger assembly to the apparatus container, wherein the cap base and the cap side wall define a cap interior space for the end cap, wherein the plunger head is movably disposed in the cap interior space, wherein the moving of the plunger head comprises moving the plunger head between the cap interior space and the interior space, wherein the plunger assembly further comprises a plunger sleeve and a plunger rod, wherein the plunger sleeve comprises an internal chamber extending between a first open end of the plunger sleeve and a second open end of the plunger sleeve, wherein the second open end is attached to an outer surface of the cap base around a cap opening disposed on the cap base of the end cap, wherein the plunger rod is movably disposed in the internal chamber of the plunger sleeve, wherein the plunger rod extends between a first rod end and a second rod end, wherein the second rod end is attached to the plunger head on a top side of the plunger head by extending through the cap opening and the first rod end is attached to the plunger handle on a bottom side of the plunger handle, wherein the plunger rod moves from a first position to at least one second position in the internal chamber based on the at least one force for the moving of the plunger head.

9. The apparatus of claim 8, wherein the plunger assembly further comprises a spring coupled with the plunger rod, wherein the spring is disposed in the internal chamber of the plunger sleeve, wherein the spring comprises a first spring end and a second spring end, wherein the first spring end is attached to the plunger handle on the bottom side of the plunger handle and the second spring end is attached to the second open end of the plunger sleeve, wherein the spring is configured for transitioning from an extended state to a compressed state based on the at least one force for facilitating the moving of the plunger head from the cap interior space to the interior space, wherein the spring is further configured for transitioning from the compressed state to the extended state based on a removal of the at least one force for moving the plunger head from the interior space to the cap interior space by moving the plunger rod from the at least one second position to the first position.

10. The apparatus of claim 9, wherein the plunger handle comprises a handle top and a handle rod coupled with the handle top, wherein the handle rod extends between a first handle end and a second handle end, wherein the spring and the plunger rod are attached to the second handle end of the handle rod, wherein the handle rod moves in the internal chamber based on the at least one force, wherein the moving of the handle rod moves the plunger head.

11. The apparatus of claim 10, wherein the handle rod comprises a first stopping element disposed on the handle rod proximal to the first handle end, wherein the plunger sleeve comprises a second stopping element disposed on the plunger sleeve proximal to the first open end, wherein the first stopping element interfaces with the second stopping element for limiting the moving of the handle rod into the internal chamber to a moving limit, wherein the limiting of the moving of the handle rod limits a distance of the moving of the plunger head from the cap interior space to the interior space by the moving limit.

12. The apparatus of claim 8, wherein the plunger assembly is detachably coupled with the apparatus container.

* * * * *